United States Patent [19]
Närvänen

[11] Patent Number: 6,081,839
[45] Date of Patent: Jun. 27, 2000

[54] IMPROVING MODIFIABILITY OF COMPUTER MANAGEMENT SYSTEM TO INCLUDE SELECTOR PART

[75] Inventor: Pia Närvänen, Pirkkala, Finland

[73] Assignee: Nokia Telecommunications Oy, Espoo, Finland

[21] Appl. No.: 09/077,134

[22] PCT Filed: Nov. 22, 1996

[86] PCT No.: PCT/FI96/00634

§ 371 Date: May 22, 1998

§ 102(e) Date: May 22, 1998

[87] PCT Pub. No.: WO97/20412

PCT Pub. Date: Jun. 5, 1997

[30] Foreign Application Priority Data

Nov. 24, 1995 [FI] Finland ..................... 955676

[51] Int. Cl.[7] .................. G06F 15/173; G06F 15/16
[52] U.S. Cl. .................. 709/223; 709/243; 709/249
[58] Field of Search .................. 709/223, 243, 709/249

[56] References Cited

U.S. PATENT DOCUMENTS 5,504,921  4/1996  Dev et al. .................. 709/223
5,774,669  6/1998  George et al. .................. 709/224

FOREIGN PATENT DOCUMENTS 0 602 824 A2  6/1994  European Pat. Off. .
0 661 891 A1  7/1995  European Pat. Off. .
WO 93/18598  9/1993  WIPO .

OTHER PUBLICATIONS

Copy of International Search Report for PCT/FI96/00634.
International Telecommunication Union, CCITT Recommendation M. 3010, "Principles for a Telecommunications Management Network", p. 1–6.
Gamma, et al., *Design Patterns*, "Elements of Reusable Object—Oriented Software", p. 87–106.
Rumbaugh, et al., *Object Modeling*, "Object Oriented Modeling and Design", p. 21–56.

*Primary Examiner*—Krisna Lim
*Attorney, Agent, or Firm*—Altera Law Group LLC

[57] ABSTRACT

The invention relates to a method for implementing a data system providing computer-controlled services. According to the method, (a) a controlling part (11) of the system is divided into an unchanging part (14) and changing parts (MO) which model, within the controlling part, the elements representing the real world and communicate with them to provide a user with services, (b) a part (12) of the system representing the real world is provided with elements of several different types and several different practical implementations of at least one type, and (c) a separate element is implemented in the controlling part (11) of the system, the unchanging part (14) searching from this element the concrete implementation of the changing part. In order to improve the modifiability of the system, the separate element is implemented in the form of a selector part (61) that is common to the changing parts and that selects the concrete implementation to be used on the basis of the parameters supplied thereto.

5 Claims, 6 Drawing Sheets

IMPROVING MODIFIABILITY OF COMPUTER MANAGEMENT SYSTEM TO INCLUDE SELECTOR PART

This application is based on application No. 955 676 filed in Finland on Nov. 24, 1995, the content of which is incorporated hereinto by reference.

FIELD OF THE INVENTION

The invention relates generally to data systems whose field of application often comprises changing parts. Such systems include for example management systems for telecommunications networks (i.e. network management systems).

More precisely, the invention relates to a method for implementing a data system providing computer-controlled services and comprising a first part comprising elements representing the real world, and a controlling part controlling the first part, the method comprising the steps of dividing the controlling part of the system into an unchanging part and changing parts which model, within the controlling part, the elements representing the real world and communicate with them to provide the user with services, providing the part of the system representing the real world with elements of several different types and several different practical implementations of at least one type, so that a certain changing part corresponds to one or several practical implementations and communicates with the corresponding one or several practical implementations, implementing a separate element in the controlling part of the system, the unchanging part searching from said separate element the concrete implementation of the changing part that corresponds to the desired implementation of the real world.

BACKGROUND OF THE INVENTION

For example mobile telecommunication networks are developed rapidly and new network elements are installed in the networks of network operators and old network elements are updated to provide new services. Unfortunately international standards are not accurate enough, however, wherefore there are differences in management interfaces of network elements between both different manufacturers and different versions. Especially with the new free competition in the field of telecommunications it is more important for the network operators to rapidly introduce the new services enabled by the network. In order to enable the use of the services, the network management system must first be modified to support the new management interface versions and the network elements of new manufacturers. The implementation of these modifications is at present slow, which delays the introduction of both new services and new types of apparatuses.

A model of a network management system is shown in FIG. 1. Network operators who work in operation centres OC (or OMC=operation and maintenance centre) use network management workstations WS that are connected to a separate workstation network WSN, such as Ethernet. The management system is typically decentralized into several computers of the workstation network, some of the computers comprising a database DB containing the data required for managing the network. The management system is connected via an interface defined in the international standards, for example, to a mobile telecommunication network MN having network elements that are denoted by NE. These network elements could include, for example, a mobile services switching centre MSC, a base station controller BSC, a base station BTS and a mobile station MS. The connection to the network to be managed takes place via a datacommunications network DCN. This kind of datacommunications networks are disclosed e.g. in CCITT Recommendation M.3010, Geneva, 1992, *Principles for a Telecommunications Management Network*, International Telecommunication Union (ITU), especially pages 1–6, the content of which is incorporated hereinto by reference. Logically, then there are two networks: (a) the network used to provide clients with services (e.g. a mobile network MN) and (b) the network used to maintain the network providing services.

When network operators manage large networks, they often divide the networks into parts that are managed by certain individuals in the local management centre. The network operators also need centralized management centres (e.g. at night one centralized management centre may manage several parts of the network). These local and centralized management centres have their own installations of a data system that are configured specifically to manage a part/parts of the network (in order to make the data system as effective as possible). Performing these configurations is rather difficult and time-consuming, however.

Besides wanting the freedom to assemble their network from the network elements of different equipment suppliers, the network operators also want to update the software of the network elements freely. For example, the operators want to update a part of the network at a certain moment and not to update the rest of the network. The operators therefore want to use new versions in a restricted part of the network for a certain trial period, for example six months, whereafter the rest of the network could be updated if the new versions are found suitable.

At the moment, the manufacturers of network management systems cannot give the network operator this freedom to update the software of the network elements due to the poor ability of the systems to process a multi-version and multi-supplier environment. In practice the network operator then has two choices: either to update the entire network in a short time or to suffer from defects in the functionality of the network management software.

The above-described problem has a known solution, i.e. a design pattern known in the literature by the name abstract factory. The arrangement is implemented in the following manner:

1) A separate interface is defined for the changing part of the application (e.g. a network management application). In a way this interface is a protocol definition that describes how the unchanging part and the changing part communicate with each other.

2) The changing parts of the application are implemented in such a way that they comply with the interface definitions according to item 1).

3) The application is provided with a so-called abstract factory from which the unchanging part of the application requests for the implementation of the changing part.

FIG. 2 is a functional block diagram illustrating a network management system based on the aforementioned known arrangement. The system consists of a controlling part 11 (comprising the network management software and hardware located in the operation centre) and of the network 12 to be managed and of a management interface 13 located between them. The controlling part and the network to be managed communicate with each other via the management interface. The network to be managed comprises several network elements; the figure shows two different network elements denoted with A and B. Network element A may be for example a base station controller and network element B may be a mobile services switching centre.

Network management software is typically implemented in such a way that it consists of an unchanging part 14 that remains the same in change situations and of several changing parts that model such parts of the network to be managed (e.g. network elements) that can change.

The network management software (the controlling part 11) therefore comprises a part A' that corresponds to network element A, that corresponds to the part of the software that models within the controlling part network element A of the network to be managed, and that communicates with the physical network element A. Correspondingly, the network management software comprises a part B' that corresponds to network element B, that models in the network management software the physical network element B and that communicates with the physical network element B (in the figure the communication is illustrated with arrows passing through the management interface 13). These changing parts contained in the controlling part are denoted with a common reference MO.

In the aforementioned solution, the network management software comprises a special abstract factory 15 from which the unchanging part of the software requests for the (concrete) implementations of the changing parts. This is illustrated with an arrow denoted by GetA' ( ). After it has obtained the reference data of the changing part, the unchanging part of the software makes the part (A') perform the desired functions. This is illustrated with an arrow denoted by Function1( ).

The abstract factory arrangement is described in greater detail in *Design Patterns, Elements of Reusable Object-Oriented Software* by Gamma, E., Helm, R., Johnson, R. and Vlissides, J. (Addison-Wesley 1995, ISBN 0-201-63361-2, pp. 87–106) that provides a more detailed description, if required.

The above-described known arrangement has drawbacks, however, that are related for example to a multi-supplier environment in the case of a network management system.

FIGS. 3a and 3b illustrate how a network management system implemented with the abstract factory model is modified to the management of networks supplied by different manufacturers. FIG. 3a illustrates the management of a network supplied by manufacturer1 and FIG. 3b illustrates the management of a network provided by manufacturer2. The network elements include in this example a base station BTS and a mobile services switching centre MSC. No problems have occurred yet in the cases shown in FIGS. 3a and 3b, since there is only one concrete implementation of one changing part (a base station or a mobile services switching centre).

The lack of problems in the above-described examples is due to the fact that the effectiveness of the abstract factory arrangement is based on an assumption that one environment is comprised of only one implementation of one changing part. However, this assumption does not hold true in practice in the network management environment, since the network of the network operator may comprise different versions of one network element (e.g. a base station) provided by several different suppliers. The abstract factory model solves the problem of managing several implementations by multiplying the abstract factory parts of the system. FIG. 4 illustrates a system where the managed network comprises network elements supplied both by manufacturer1 and by manufacturer2. FIG. 5 illustrates a system where the managed network comprises different versions of the same network element (a BTS or an MSC) provided by the same manufacturer. For the sake of clarity, the figures do not show the communication passing through the management interface. This communication corresponds entirely to what is shown in FIG. 2: corresponding parts communicate with each other.

According to this known arrangement, several abstract factory parts (in the FIGS. 15a to 15d) are added to the system if there are several different implementations of one changing part. However, such an arrangement cannot be used to eliminate the aforementioned drawbacks, since it breaks the division of software into an unchanging and changing part (which increases the time used for implementing the change). For example if the network operator adds to the network a base station supplied by manufacturer3, the unchanging part of the software must be changed since it must start using the abstract factory specialized in the network elements of manufacturer3.

BRIEF DESCRIPTION OF THE INVENTION

The object of the present invention is to eliminate the above-described drawbacks by providing a new type of arrangement for implementing a data system of the type described above.

This object is achieved with a method according to the invention that is characterized in that the method further comprises the step of realizing said separate element in the form of a selector part that is common to the changing parts and that selects the concrete implementation to be used on the basis of the parameters supplied thereto.

The invention also relates to a data system for providing a user with computer-controlled services, the system comprising a first part comprising elements representing the real word, and a controlling part controlling the first part and divided into an unchanging part and changing parts which model the elements of the real world and communicate with them to provide the user with services, several different types of elements of the real world and several different practical implementations of at least one type, so that a certain changing part corresponds to one or several practical implementations in the controlling part and communicates with the corresponding one or several practical implementations, a separate element in the controlling part, the unchanging part searching from said element the concrete implementation of the changing part that corresponds to the desired implementation of the real world. The inventive data system is characterized in that said separate element is implemented in the form of a selector part that is common to the changing parts and that selects the practical implementation to be used by means of parameters supplied thereto.

The idea of the invention is to assemble in the shared, restricted part of the system (called hereinafter a selector part) the ability to select the implementation used in the application. The interfaces and the parameters to be used in the interfaces are determined for this selector part in such a way that when the unchanging part of the application gives to the selector part the parameters of the interface, the selector part returns the desired implementation to the unchanging part. The network architecture is therefore changed with respect to the known arrangement in such a way that the knowledge affecting the selection is transferred from the unchanging part to the centralized selector part, which is provided with the data on the basis of which the implementation can be selected.

Due to the arrangement according to the invention, changes in the data system can be implemented considerably more rapidly than before, and new services can therefore be introduced faster to the end users of the system. The different system configurations can also be carried out more easily and rapidly. This also results in greater freedom for the system user (e.g. an operator of a telecommunication network) to update the software.

The system is also better organized due to the invention since the changing parts, such as version-specific and supplier-specific elements, are centralized in a certain part of the system.

In more precise terms, the invention relates to a method for implementing a data system which provides computer-controlled services with two basic parts. Part 1 contains elements which represent the real world, and the function of Part 2 is basically to control Part 1. The controlling part, or Part 2, is then broken up into two segments: an unchanging and a dynamic segment. These segments are used to:

1) Model the elements representing the real world in Part 1, and to communicate with these elements to provide the user with services.

2) Provide Part 1 with elements of several different types and several different practical implementations of at least one type so that for every practical implementation there is one dynamic part which is assigned to correspond to and communicate with it. In this model, the same dynamic part can, however, have multiple practical implementations assigned to it. So the same dynamic part can actually handle many practical implementations.

3) Implement a separate element in Part 2 of the system. The unchanging part will then search this separate element for the concrete implementation of the dynamic part that corresponds to the desired implementation of the real world.

BRIEF DESCRIPTION OF THE FIGURES

In the following, the invention and the preferred embodiments will be described in greater detail with reference to the examples according to the accompanying drawings, in which.

DETAILED DESCRIPTION OF THE INVENTION

The solution to the above-described problem is based on the fact that the architecture of a known system is changed in such a way that several changing parts of the same interface are provided with one common selector part, and the ability to select the implementation of the (concrete) part required in each case on the basis of the information given to the selected part is transferred thereto. The selector part is preferably common to all changing parts.

More precisely, the solution to the problem is based on the following matters:

1) Interfaces are defined for the changing parts of the system. Such interfaces in a network management system may be for example a base station (BTS) and a mobile services switching centre (MSC). The interface describes the services provided by the changing part (e.g. what kind of data can be requested from the part and which operations the part can be made to perform). Each changing part is given an individual symbol (that may be for example the name of the changing part corresponding to the interface).

2) The data on the basis of which the required implementation of the changing part can be deduced is determined. This data will be called hereinafter 'selector parameters'. For example in a network management system the selector parameters include the type of the network element, the name of the manufacturer, the version of the network element, and the version of the management service used.

3) The system is provided with the aforementioned selector part from which the unchanging part of the system requests for the implementations of the changing part by providing the selector part with the selector parameters of the desired interface (e.g. interface "BTS" and parameters "manufacturer1, version 4.3"). On the basis of these parameters the selector part decides which implementation is used in each case.

4) The changing parts of the system are implemented in such a way that they comply with the interface definitions of item 1).

Figure 1:
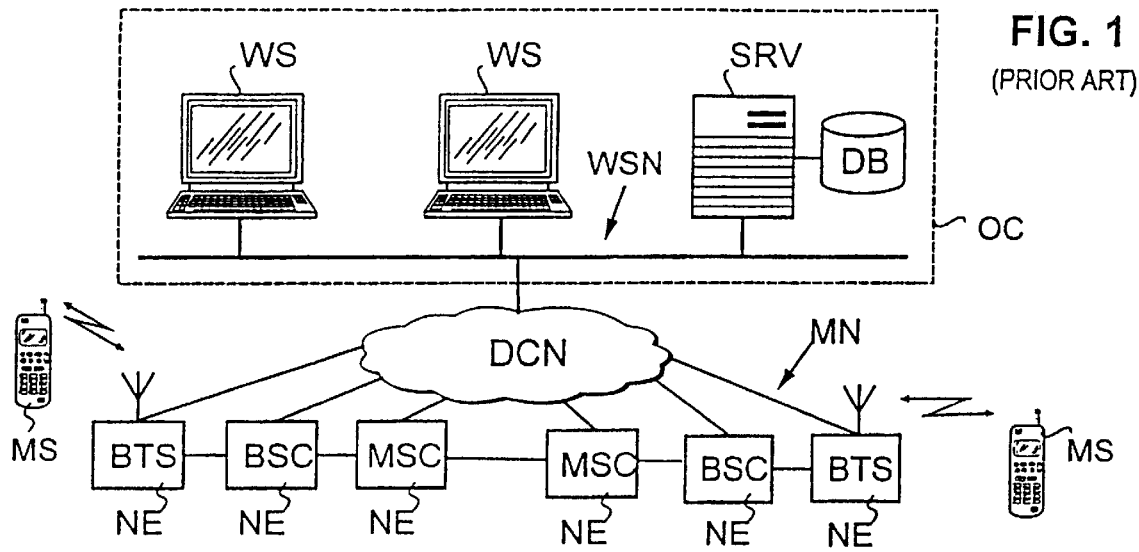
FIG. 1 illustrates a network management system.
Figure 2:
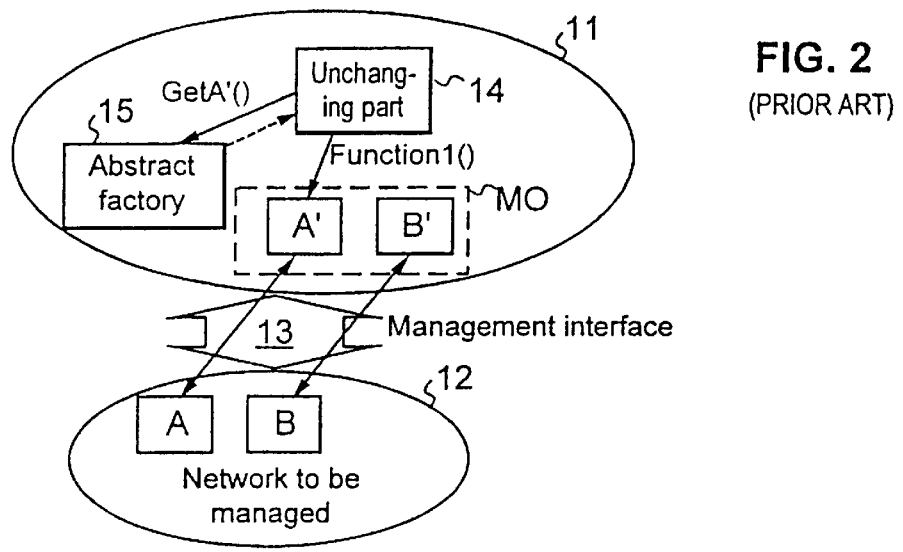
FIG. 2 is a functional block diagram illustrating a network management system implemented in a known manner.
Figure 3A:
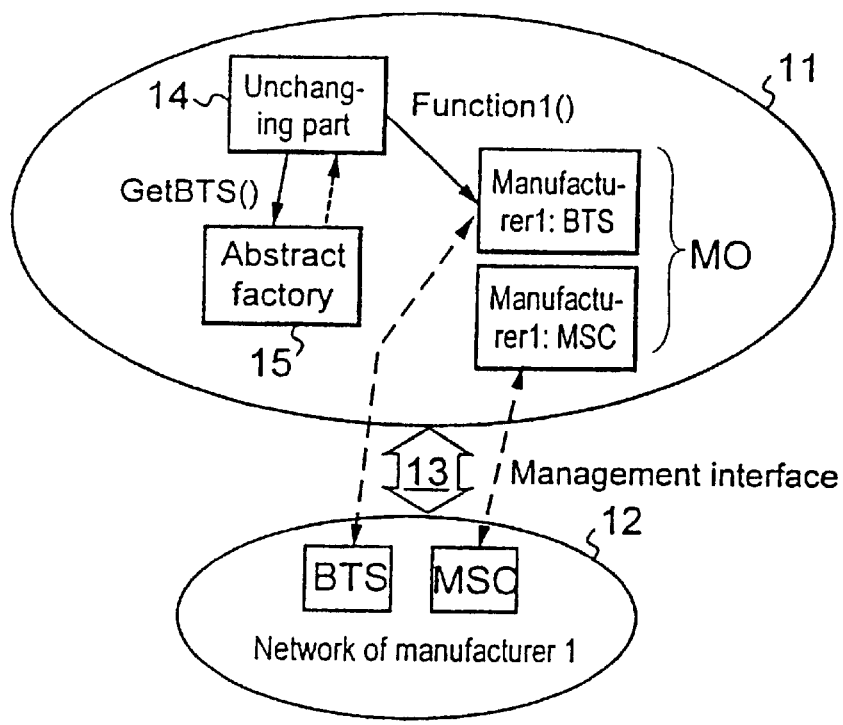
FIGS. 3a and 3b illustrate the arrangement of FIG. 2 in a case where apparatuses supplied by only one manufacturer are used in the telecommunication network to be managed.
Figure 3B:
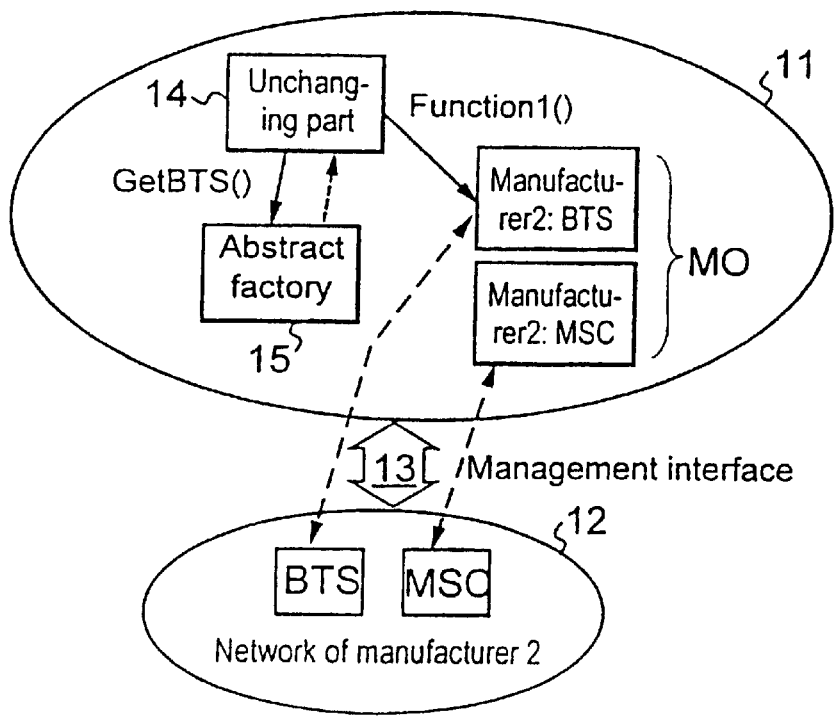
Figure 4:
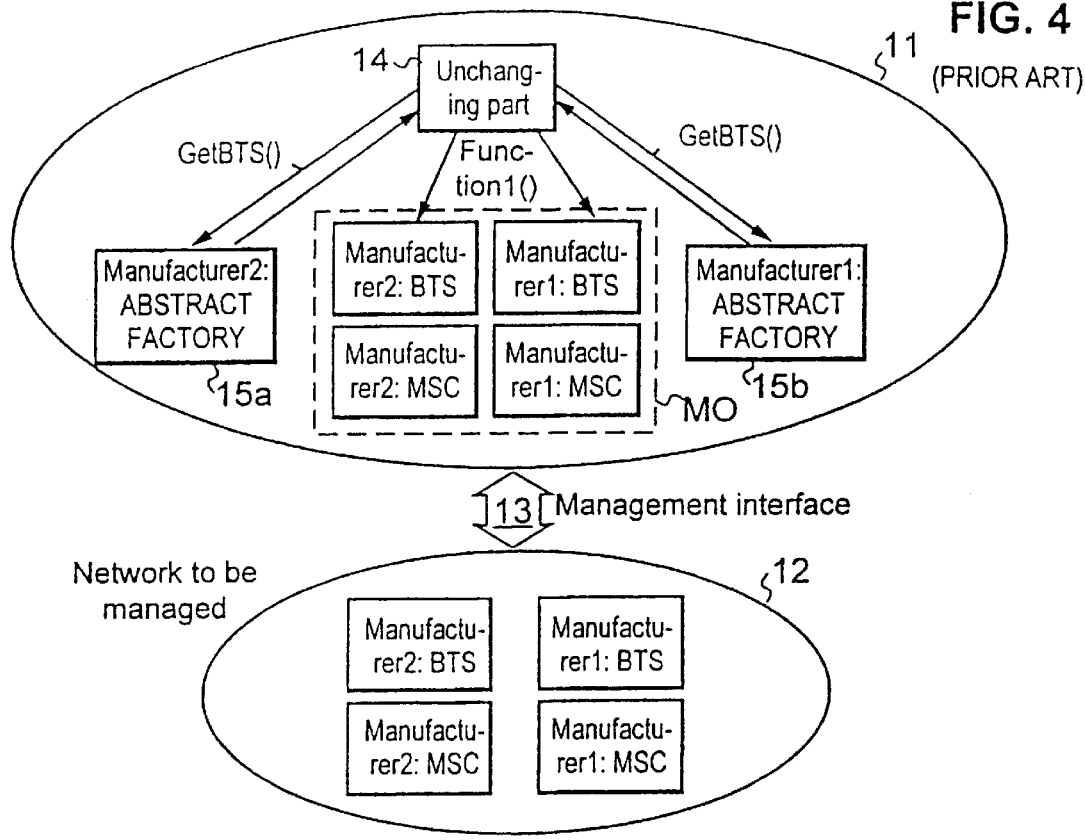
FIG. 4 illustrates the arrangement of FIG. 2 in a case where apparatuses supplied by two different manufacturers are used in the telecommunication network to be managed.
Figure 5:
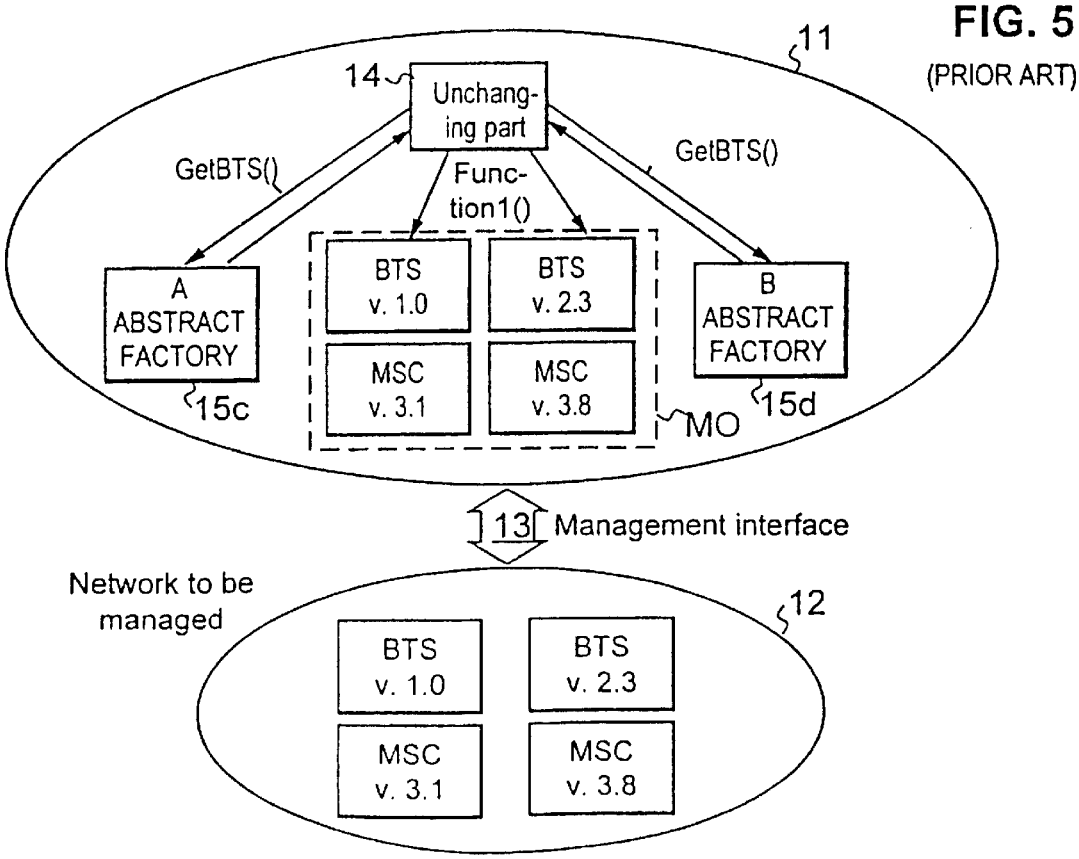
FIG. 5 illustrates the arrangement of FIG. 2 in a case where apparatuses that are supplied by the same manufacturer but that comprise several different versions are used in the telecommunication network to be managed.
Figure 6:
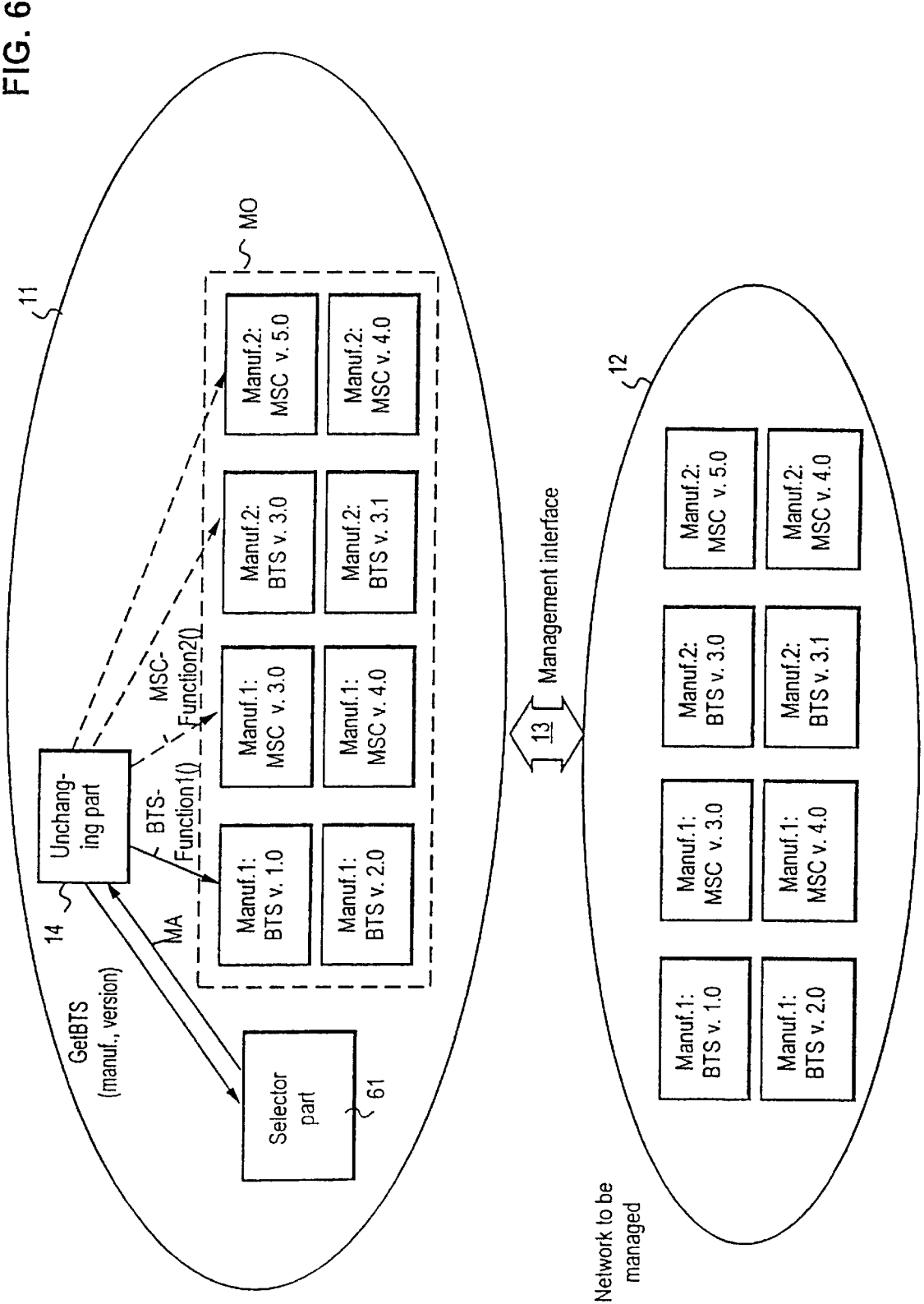
FIG. 6 illustrates the arrangement according to the invention in a case where apparatuses supplied by different manufacturers and comprising several different versions are used in the telecommunication network to be managed.

FIG. 6 illustrates the data system according to the invention in the same manner as the known solution described above. However, in this case the network to be managed comprises network elements supplied by both manufacturer1 and manufacturer2. There are also several (management interface) versions of the network elements of each manufacturer in the network. The system therefore comprises network elements of several different types (base stations and mobile services switching centres) and there are several different practical implementations of at least one type (apparatuses of different manufacturers or different versions supplied by the same manufacturer).

The selector part that is common to the changing parts is denoted by reference numeral 61. The unchanging part 14 of the network management software requests for the implementations of the changing parts, i.e. interfaces, from the selector part and provides it with the required selector parameters, such as the type of the network element, the symbol of the manufacturer and the version symbols. This first step is denoted by an arrow GetBTS(manuf., version). The selector part has the knowledge how to deduce the implementation of the changing part on the basis of the parameters and therefore it returns the reference data for the implementation back to the unchanging part 14. In practice the selector part returns to the unchanging part for example a memory address MA that indicates the implementation that corresponds to the parameters provided by the unchanging part. After it has extracted the data concerning the implementation of the changing part from this memory address, the unchanging part uses the services of the changing part (cf. the arrows BTSFunction1( ) and MSCFunction2( ) in the figure).

If the network operator adds to the network for example a base station supplied by manufacturer3, the network management system can be rapidly changed to support the base station. A version specialized in the network elements of manufacturer3 is then implemented from the interface of the base station, and data about the existence of the version is added to the selector part 61. Correspondingly, new versions of management interfaces are processed in an equally simple manner.

In practice, the addition of new services often requires new functionality in the network management software, so that the existing functions of the system are modified to support the new network elements by means of the selector part, and completely new functions are also implemented in the network management system.

Figure 7:
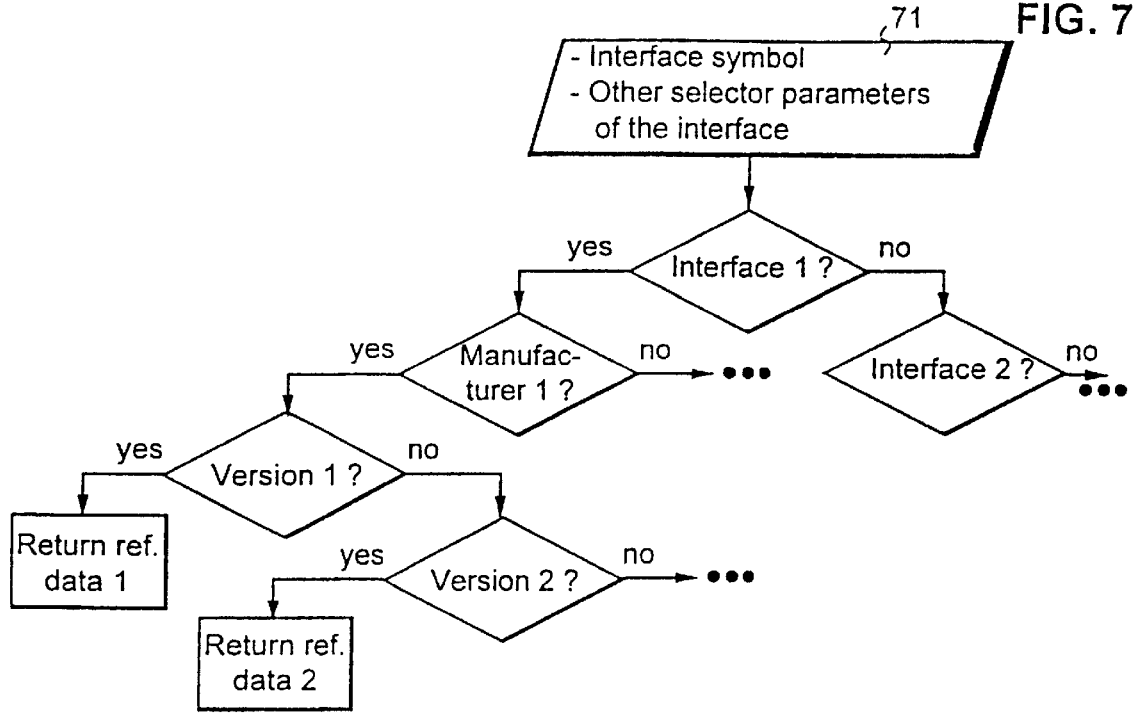
FIG. 7 is a flow chart illustrating the operation of a selector part.

FIG. 7 is a flow chart illustrating the operation of the selector part. The selector part deduces the corresponding reference data on the basis of the parameters it has obtained. The selector part obtains as input data (reference numeral 71) the symbol of the interface (e.g. "base station") and the other selector parameters of the interface, such as the name of the apparatus manufacturer and the version number of the apparatus (e.g. the version number of the base station). Different interfaces may have different selector parameters. The operation of the selector part first branches off according to the interface to be processed (e.g. according to which network element the interface corresponds to) and thereafter according to the other selector parameters of the interface. Since in the example shown in the figure the other selector parameters are the name of the apparatus manufacturer and the version number, the operation of the selector part branches off within the interface first according to the manufacturer of the apparatus and then according to the version number. When the operation has branched off according to all the selector parameters, the selector part knows which implementation of the interface corresponds to the given parameters. Finally, the selector part returns the reference data corresponding to this implementation to the unchanging part.

The reference data is data referring to the implementation according to the parameters. It may be for example a memory address where the instance of the object or the function corresponding to the parameters is stored.

Figure 8:
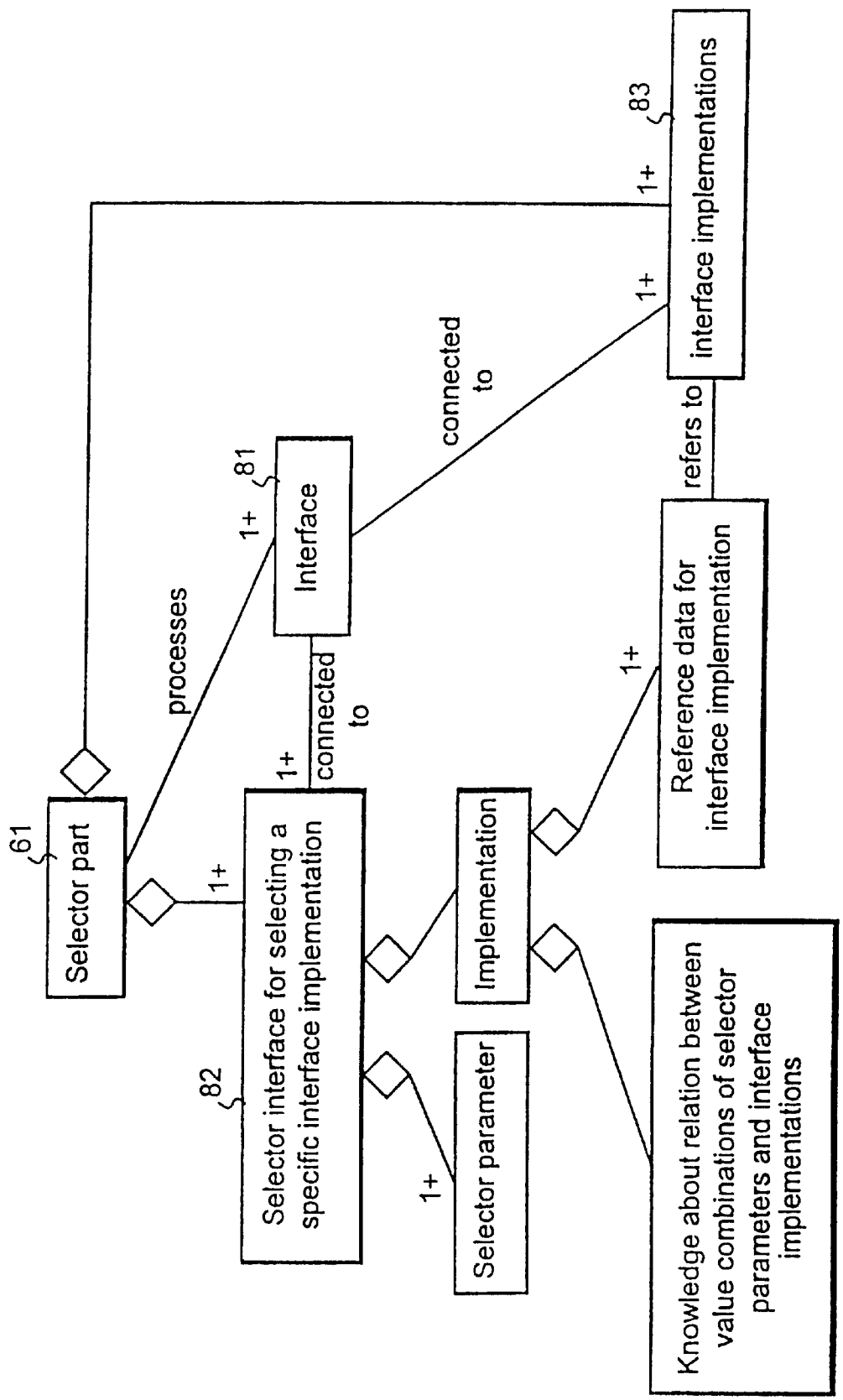
FIG. 8 is a block diagram illustrating the structure of a subsystem related to the selector part.

FIG. 8 illustrates the operating environment of the selector part with the generally known OMT notation described for example in *Object Oriented Modelling and Design* by James Rumbaugh et al. (Prentice-Hall, N.J., USA, 1991, Chapter 3).

The selector part 61 processes 1 to n interfaces 81. 1 to n selector interfaces 82 and 1 to n interface implementations 83 are further connected to each interface. One selector interface is connected to one interface and one interface implementation is connected to one interface.

The selector part 61 comprises 1 to n interface implementations and 1 to n selector interfaces each of which is used to select an implementation for one interface. Each selector interface comprises 1 to n selector parameters and an implementation for a selector interface. The implementation of the selector interface comprises knowledge about the correspondence between the value combinations of the selector parameters and the interface implementations (i.e. which interface implementation corresponds to which value combination of the selector parameters), and reference data for these interface implementations.

Figure 9:
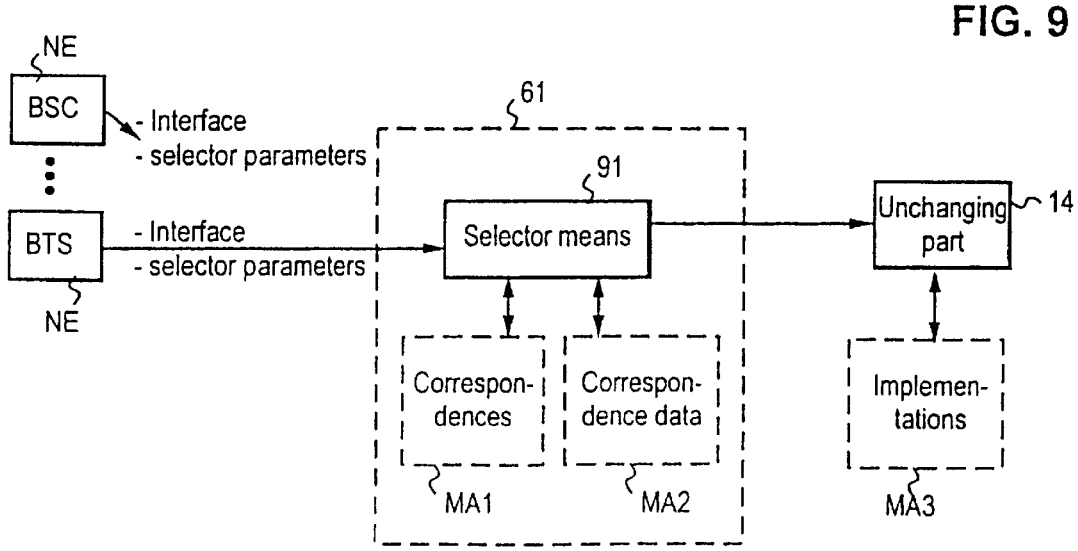
FIG. 9 shows the subsystem of FIG. 8 in an alternative manner.

The subsystem of FIG. 8 can also be described as shown in FIG. 9. The subsystem comprises selector means 91 that are supplied with the data (e.g. the name of the interface) Identifying the interface and the other selector parameters. The memory area MA1 of the subsystem stores knowledge about the correspondence between the value combinations of the selector parameters and the interface implementations. The selector means select, on the basis of their input data, from the memory area MA1 the interface implementation that corresponds to the value combination provided as input data. In practice, the memory area MA1 may consist of a table that is read by the selector means. After the selector means have located the correct interface implementation from the memory area MA1, they search from the memory area MA2 the reference data corresponding to this implementation. The memory area MA2 may also be a table comprising reference data corresponding to each implementation. The selector means return the reference data they have located to the unchanging part 14 of the system. The memory areas MA1 and MA2 can also be combined in such a way that they are different columns in the same table. Each individual piece of reference data refers to the memory area MA3 from which the unchanging part 14 of the system finds the implementation of the changing part by means of the reference data.

The arrangement according to the invention can also be utilized in a system covering several different applications. The system then comprises several application-specific selector parts. The feature essential to the invention is that one selector part is common to such a group of changing parts that comprises different types of changing parts and several different practical implementations of at least one type.

Due to the arrangement according to the invention, changes can be restricted to a very small part of the system. This speeds up the testing of the system and makes the system management more effective. Services are also introduced more rapidly to the user. The network management system can be configured to different environments by changing the selector part to be used and by connecting the required changing parts to the controlling part. If the changing parts include for example parts supporting the network elements of manufacturer1, manufacturer2 and manufacturers, and the controlling part 11 of the system is to consist of 1. a version supporting only the network elements of manufacturer1, 2. a version supporting the network elements of manufacturer1 and manufacturer3, 3. a version supporting the network elements of manufacturer1, manufacturer3 and manufacturer2, the changes can be carried out easily. In order to carry out the aforementioned configurations, three different versions of the selector part are realized and the controlling part 11 is assembled in the following manner:

1. the unchanging part of the software, the parts processing the elements of manufacturer1 and the selector part specialized in manufacturer1 are combined, 2. the unchanging part of the software, the parts processing the network elements of manufacturer1 and manufacturer3, and the selector part specialized in the elements of manufacturer1 and manufacturer3 are combined, and 3. the unchanging part of the software, the parts processing the network elements of manufacturer1, manufacturer3 and manufacturer2, and the selector part specialized in the elements of manufacturer1, manufacturer3 and manufacturer2 are combined.

When needed, one changing part can deal with several practical implementations. For example: an operator has versions 2.0, 2.1 and 2.2 of a base station made by manufacturer2 in his network. The changes in the management interface of the base station from version 2.0 to 2.1 and 2.2 do not require new changing parts in an application of a network management system. Instead, the application is modified to support base station versions 2.1 and 2.2 as well as 2.0 by modifying the selector part so that the changing part of version 2.0 corresponds also to versions 2.1 and 2.2.

Even though the invention is described above with reference to the examples according to the accompanying drawings, it is clear that the invention is not restricted thereto, but it can be modified within the scope of the inventive idea disclosed above and in the appended claims. Nor is the invention restricted to a certain type of application environment, but it can be used in different kinds of applications, such as object-based applications or functional applications. In an object-based application the above-described reference data is a pointer to the object instance and in a functional application it is a pointer to the function. The method can also be used for producing services in systems other than network management systems, although a network management system is an advantageous environment of implementation due to the above-described problems. The selector parameters may also be of different types; instead of the above-described static parameters, dynamic parameters, such as time, can also be used.

I claim:

1. A method for implementing a data system providing computer-controlled services and comprising a first part (12) comprising elements representing the real world, and a controlling part (11) controlling the first part, the method comprising the steps of dividing the controlling part (11) of the system into an unchanging part (14) and changing parts (MO) which model, within the controlling part, the elements representing the real world and communicate with them to provide the user with services, providing the part (12) of the system representing the real world with elements of several different types and several different practical implementations of at least one type, so that a certain changing part corresponds to one or several practical implementations and communicates with the corresponding one or several implementations, implementing a separate element in the controlling part (11) of the system, the unchanging part (14) searching from said separate element the concrete implementation of the changing part that corresponds to the desired implementation of the real world, characterized in that the method further comprises the step of realizing said separate element in the form of a selector part (61) that is common to the changing parts and that selects the concrete implementation to be used on the basis of the parameters supplied thereto.

2. A method according to claim 1 for providing network management services, characterized in that the selector part (61) is implemented so that it is common to several changing parts that together represent several different types of network elements, several different manufacturers and several different versions of network elements.

3. A method according to claim 2, characterized in that the parameters comprise a symbol for the manufacturer of the network element and a symbol for the version of the network element.

4. A data system for providing a user with computer-controlled services, the system comprising a first part (12) comprising elements representing the real world, and a controlling part (11) controlling the first part and divided into an unchanging part (14) and changing parts (MO) which model the elements of the real world and communicate with them to provide the user with services, several different types of elements of the real world and several different practical implementations of at least one type, so that a certain changing part corresponds to one or several practical implementations in the controlling part (11) and communicates with the corresponding one or several practical implementations, a separate element in the controlling part (11), the unchanging part searching from said element the concrete implementation of the changing part that corresponds to the desired implementation of the real world, characterized in that said separate element is implemented in the form of a selector part (61) that is common to the changing parts and that selects the practical implementation to be used by means of parameters supplied thereto.

5. A data system according to claim 4 for providing network management services, characterized in that the selector part (61) is common to several changing parts that together represent several different types of network elements, several different manufacturers and several different versions of network elements.

* * * * *